United States Patent
Chang

(10) Patent No.: US 7,289,564 B2
(45) Date of Patent: Oct. 30, 2007

(54) VIDEO ENCODING METHOD WITH SUPPORT FOR EDITING WHEN SCENE CHANGED

(75) Inventor: Yung-Ching Chang, Kao Hsiung County (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 719 days.

(21) Appl. No.: 10/658,374

(22) Filed: Sep. 10, 2003

(65) Prior Publication Data

US 2005/0053133 A1    Mar. 10, 2005

(51) Int. Cl.
*H04N 7/18*    (2006.01)
(52) U.S. Cl. .............. 375/240.13; 375/240.26
(58) Field of Classification Search ............... 375/240.01–240.29
See application file for complete search history.

(56) References Cited

U.S. PATENT DOCUMENTS 6,038,000 A * 3/2000 Hurst, Jr. ............... 375/240.26
6,301,428 B1 * 10/2001 Linzer ........................ 386/52
6,529,555 B1 * 3/2003 Saunders et al. ...... 375/240.26
6,731,684 B1 * 5/2004 Wu ........................ 375/240.12
6,754,275 B1 * 6/2004 Yasuda et al. ......... 375/240.25

* cited by examiner

*Primary Examiner*—Andy Rao
(74) *Attorney, Agent, or Firm*—Birch, Stewart, Kolasch & Birch, LLP

(57) ABSTRACT

A video encoding method with support for editing when scene changed. The video encoding method reads and stores the pictures by the display order and detects whether the scene change occurred. The method encodes the pictures by the coding order when there are not scenes changed and encodes the pictures by a special coding process when there are scenes changed. Because the video encoding method encodes the pictures with considering the states of scenes changed and generates a new GOP when a scene change occurred, the video sequence can be cut into two parts by an image editing process without re-encoding. Therefore, the video can be edited without any loss and the editing performance of the editing process can be better.

3 Claims, 3 Drawing Sheets

$$\ldots R^A \ B_1^A \ B_2^A \ \ldots \ B_{M-1}^A R^B \ B_1^B \ B_2^B \ \ldots \ B_{M-1}^B R^C \ \ldots \quad \text{(display order)}$$

$$[\ldots R^B \ B_1^A \ B_2^A \ \ldots \ B_{M-1}^A][R^C \ B_1^B \ B_2^B \ \ldots \ B_{M-1}^B][R^D \ \ldots \quad \text{(coding order)}$$

...PBB[IBBPBBPBBPBBPBB]IBBP... (coding order)

...P[BBIBBPBBPBBPBBP]BBIBBP... (display order)

FIG. 1 (PRIOR ART)

...$B_1$ $B_2$ $P_3$ $B_4$ $B_5$ $I_6$ $B_7$ $B_8$ $P_9$ $B_{10}B_{11}P_{12}$... (display order)

[...$P_3$ $B_1$ $B_2$ ][$I_6$ $B_4$ $B_5$ $P_9$ $B_7$ $B_8$ $P_{12}B_{10}B_{11}$...] (coding order)

FIG. 2 (PRIOR ART)

...$R^A$ $B_1^A$ $B_2^A$ ... $B_{M-1}^A R^B$ $B_1^B$ $B_2^B$ ... $B_{M-1}^B R^C$ ... (display order)

[...$R^B$ $B_1^A$ $B_2^A$ ... $B_{M-1}^A$][$R^C$ $B_1^B$ $B_2^B$ ... $B_{M-1}^B$][$R^D$ ... (coding order)

FIG. 3

...$R^A$ $B^A_1$ $B^A_2$ ... $B^A_{M-1}R^B$ $R^C$ $B^C_1$ $B^C_2$ ... $B^C_{M-1}R^D$ ...   (display order)

[...$R^B$ $B^A_1$ $B^A_2$ ... $B^A_{M-1}$][$R^C$ $R^D$ $B^C_1$ $B^C_2$ ... $B^C_{M-1}$][$R^E$ ...   (coding order)

FIG. 4

...$R^A$ $B^A_1$ $B^A_2$ ... $B^A_{M-1}R^B$ $B^B_1$ $B^B_2$ ... $B^B_{M-1}R^C$ ...   (display order)

[...$R^B$ $B^A_1$ $B^A_2$ ... $B^A_{M-1}$][$R^C$ $B^B_1$ $B^B_2$ ... $B^B_{M-1}$][$R^D$ ...   (coding order)

FIG. 5

...$R^A$ $B^A_1$ $B^A_2$ ... $B^A_{M-1}R^B$ $R^C$ $B^C_1$ $B^C_2$ ... $B^C_{M-1}R^D$ ...   (display order)

[...$R^B$ $B^A_1$ $B^A_2$ ... $B^A_{M-1}R^C$ ][$R^D$ $B^C_1$ $B^C_2$ ... $B^C_{M-1}$][$R^E$ ...   (coding order)

FIG. 6

VIDEO ENCODING METHOD WITH SUPPORT FOR EDITING WHEN SCENE CHANGED

BACKGROUND OF THE INVENTION

1. Field of the Invention

The invention relates to a video encoding method, especially to a video encoding method with support for editing when scene changed.

2. Description of the Related Art

In MPEG (Moving Pictures Experts Group), there are three picture types: I-picture, P-picture and B-picture. I-pictures are coded without referring to other pictures. I-pictures provide the coded sequence with access points, which are the starting points for the decoding process, but are coded with only moderate compression. P-pictures are coded more efficiently using motion compensated prediction from a past I-picture or P-picture and are generally used as a reference for further prediction. B-pictures provide the highest degree of compression but require both past and future reference pictures for motion compensation. B-pictures are never used as references for prediction. The organization of the three picture types in a sequence is very flexible. The choice of the sequence is determined by the encoder and will depend on the requirements of the application.

Because the B-pictures must refer to the past and future reference pictures, the encoding process of the B-pictures is delayed until the future reference picture is coded. Therefore, the display order is different to the coding order. This is called the reordering of B-pictures.

In MPEG-1, there is a group-of-pictures (hereinafter called as GOP) structure used to enclose some pictures into a group for manipulation. A GOP contains one I-picture, some P-pictures and some B-pictures. A GOP begins with an I-picture, and ends before the next I-pictures, in the coding order. In MPEG-2, the GOP structure becomes an option.

Generally, an encoder employs a fixed GOP structure. The size of a GOP is defined as N, and the distance between two reference pictures is defined as M. FIG. 1 illustrates a GOP with N=15 and M=3.

Typically, if the input signal for the encoder is in NTSC (National Television System Committee) format (29.97 fps), the GOP structure with N=15 and M=3 is used. If the input signal is in PAL (25 fps) or film format (24 fps), the GOP structure with N=12 and M=3 is used. These fixed default settings can achieve a good balance between the complexity of an encoder and the coding performance of most types of videos.

Typically, the editing process would cut the whole video sequence into pieces based on the scene, and then rearrange them to form a new video sequence. If a video sequence is coded with a fixed pattern composed with only I- and P-pictures, like IPPPPIPPPP . . . , the situation is pretty simple. If a scene change occurs in an I-picture of the video sequence (IPPPPIPPPP . . . ), the video sequence can be cut into two parts without any loss. If a scene change occurs in a P-picture of the video sequence, the former part of the video sequence is in a normal operation, but the remaining part of the video sequence has to be re-encoded. The first P-picture of the of the remaining part of the video sequence has to be decoded and then re-encode to an I-picture. However, because the re-encoded I-picture differs from the original P-picture, there will be some error propagations. Re-encode the whole remaining part of the GOP until the next I-picture would be a better solution, but we would remind that re-encoding degrades the image quality significantly.

If there are B-pictures in the coded sequence, video editing becomes more complex. Please refer to FIG. 2. If a scene change occurs in the picture just after the I-picture in the coding order, like the picture $B_4$, cutting from picture $I_6$ can separate the two scenes easily. However, even the picture $P_3$ and picture $B_4$ are belong to different scenes, there would be some macroblocks in picture $B_4$ and $B_5$ which needs to refer to the picture $P_3$. Therefore the picture $B_4$ and $B_5$ have to be re-encoded according to the picture $I_6$ merely. Discarding the pictures $B_4$ and $B_5$ is the easiest way, but losing the beginning pictures of a scene would not be acceptable.

If a scene change occurs in the picture $B_5$, the former part and the remaining part of the GOP have some pictures to be re-encoded. The picture $B_4$ has to be re-encoded to a P-picture and then append to the former part. In the remaining part, the coded data of the picture $B_4$ is removed and the picture $B_5$ has to be re-encoded.

If a scene change occurs in the picture $I_6$, the remaining part of the GOP has only to remove the coded data of the pictures $B_4$ and $B_5$. However, the former part of the GOP requires a complicate process. One solution is to re-encode the picture $B_5$ to a P-picture, and then re-encode the picture $B_4$ according to the pictures $P_3$ and $B_5$. Another solution is to change the two B-pictures $B_4$ and $B_5$ to two P-pictures.

If a scene change occurs in the picture $B_7$, the former part of the GOP doesn't need any additional process, and a new I-picture has to be generated for the remaining part. A choice is to change the picture $B_7$ to an I-picture, and then re-encode the remaining GOP. However, because the B-pictures usually coded with a lower quality than the I- and P-pictures, a better choice is to change the picture $P_9$ to an I-picture, and re-encode the remaining GOP. The pictures $B_4$ and $B_5$ are B-pictures with only backward reference. This method can also reduce the number of P-pictures to reduce the error caused by referring to a re-encoded picture.

If a scene change occurs in the picture $B_8$, the former part of the GOP has only to re-encode the picture $B_7$ to a P-picture. The remaining part of the GOP can change the picture $P_9$ to an I-picture and then re-encode the remaining part of the GOP.

Finally, if a scene change occurs in the picture $P_9$, the former part of the GOP is processed like the situation of picture $I_6$. For the remaining part of the GOP, the picture $P_9$ has to be changed to an I-picture, and then re-encode the remaining GOP.

Therefore, all the other situations can be processed like the methods described above, even if the number of B-pictures between two reference pictures increases to three or more.

Generally, the I-pictures are designed for the purpose of random access and preventing of error propagation. The P-pictures use the motion compensation to remove the temporal redundancy between the current picture and the reference picture to improve the compression performance. However, if there is almost no temporal redundancy between the current picture and the reference picture, such as a scene change, coding a picture as a P-picture can't obtain any benefit. In this case, coding a picture as an I-picture can achieve the same coding quality with fewer bits. Therefore, an encoder has to detect the existence of a scene change and then start a new GOP. There are many researches of the scene change detection and the algorithm of adjusting the rate control. A general idea is to detect the difference of the current picture and the reference picture from the result of motion estimation. If more than a percentage of macroblocks select the intra-coded mode, the encoder can decide that there is only few temporal redundancy existed, and therefore a scene change can be detected.

However, when a scene change is detected, if the encoder just starts a new GOP without any effort, the re-encoding of some pictures would be unavoidable during the video sequence editing process as described above.

SUMMARY OF THE INVENTION

In view of the above-mentioned problems, an object of the invention is to provide a video encoding method capable of editing scene changes.

To achieve the above-mentioned object, the video encoding method of the present invention encodes the pictures by the coding order when there are not scenes changed and encodes the pictures by a special coding process when there are scenes changed. Because the video encoding method encodes the pictures with considering the states of scenes changed and generates a new GOP when a scene change occurred, the video sequence can be cut into two parts by an image editing process without re-encoding.

Therefore, the video can be edited without any loss and the editing performance of the editing process can be better.

BRIEF DESCRIPTION OF THE DRAWINGS

FIG. 1 illustrates a GOP with N=15 and M=3.

FIG. 2 illustrates a video sequence with a B-picture.

FIG. 3 illustrates a GOP with a fixed structure.

FIG. 4 illustrates a first example of GOP with display order and coding order.

FIG. 5 illustrates a second example of GOP with display order and coding order.

FIG. 6 illustrates a third example of GOP with display order and coding order.

DETAILED DESCRIPTION OF THE INVENTION

Figure 7:
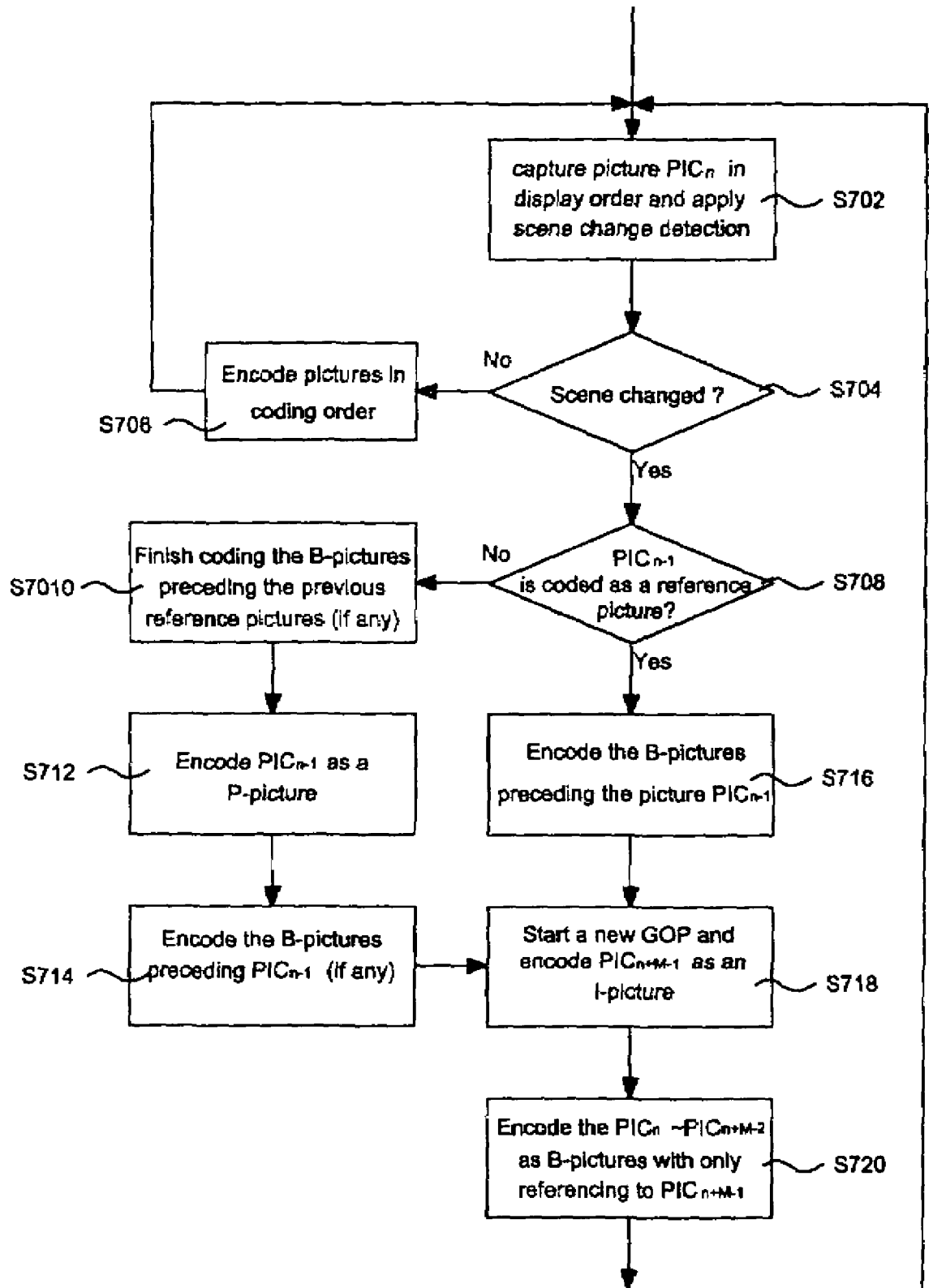
FIG. 7 shows the flowchart of the video encoding method with support for editing when scene changed of the present invention.

The video encoding method with support for editing when scene changed of the invention will be described with reference to the accompanying drawings.

First, an encoder using the video encoding method with support for editing when scene changed of the present invention also has to include the scene change detecting function. The scene change detecting function has to be applied in the display order. This is because the encoder has to know where scene changes and then encodes the pictures before and after the scene change into two GOP.

Before a scene change is detected, the encoder encodes the video sequence with a fixed GOP structure. Once a scene change is detected, the encoder decides how to encode the following pictures based on the type and position in a GOP of the present coded pictures. Please note that because the B-pictures have to be coded just after the future reference picture being coded, a scene change needs to be detected before the coding happens. FIG. 2 depicts an example. The encoder captures pictures and stores them into a buffer in the display order. The picture $B_4$ and $B_5$ are captured and not being coded until the picture $I_6$ is coded. If the encoder can encode a picture in each period of capturing a picture, the picture $I_6$ is captured and encoded in the same period. In the next period, the picture $B_4$ is encoded while the picture $B_7$ is being captured. The picture $B_5$ is encoded in the same period when the picture $B_8$ is captured. The picture $P_9$ only needs to take the picture $I_6$ as a reference so that it can be captured and encoded in the same period.

For an encoder, which encodes the video sequence with a fixed GOP structure, the distance between two reference pictures is defined as M and a reference picture (I- or P-picture) is represented as an R. The first B-picture (in the display order) after the forward reference picture $R^X$ is called $B^X_1$, the second B-picture is called $B^X_2$, and so on. The final one before the back reference picture is called $B^X_{M-1}$. FIG. 3 illustrates an example of the GOP in the display order and coding order according to this definition.

The process methods for the scene change occurred at different location are described as following.

A. A Scene Change Occurs in the First B-picture

If there is no scene change occurred in the pictures from $B^A_1$ to $R^B$, the picture $B^A_1 \sim B^A_{M-1}$ is captured and stored until the picture $R^B$ is captured and coded. If the scene changes in the picture $B^B_1$, the pictures until $R^B$ would belong to the former GOP and the pictures from $B^B_1$ would belong to a new GOP. After coding the picture $B^A_{M-1}$, if the encoder starts a new GOP and encodes the following pictures without referring to the picture $R^B$, it can completely separate the video sequence into two parts. An editing process can cut the video sequence from the new GOP without any re-encoding.

There are two strategies to start a new GOP. One is to start a fixed GOP structure from I-picture. In the above example, the original picture $B^B_1$ is changed to an I-picture $R^C$, the following M−1 pictures are B-picture $B^C_1 \sim B^C_{M-1}$, the next picture is a P-picture $R^D$, then the following-up pictures are the M−1 B-pictures, and so on. FIG. 4 illustrates an example of this case.

However, a new GOP need not be started with an I-picture in the display order. By observing the coding order in FIG. 4, we can find that there are no B-pictures between the picture $R^C$ and $R^D$. B-pictures can be coded with lower quality and bit rate than the I-pictures and P-pictures. If there are too many reference pictures in a short duration, the result is that each reference picture can't obtain enough bits to achieve a higher quality. Therefore, the second strategy of starting a new GOP is trying to maintain the ratio on the number of B-pictures and reference pictures. The first M−1 pictures of the new GOP are B-pictures, the next picture is an I-picture, the following pictures are M−1 B-pictures, and then the picture is a P-picture, and so on. FIG. 5 illustrates an example of this case.

It seems that the picture type of each picture is remaining the same as no scene change occurred. Actually, the difference is that the picture $B^B_1 \sim B^B_{M-1}$ only refer to the back picture $R^C$. In fact, there may not be M−1 B-pictures before the picture $R^C$, and can be adjusted freely.

B. A Scene Change Occurs in the Second B-picture

Please refer to FIG. 3. If a scene change occurs in the picture $B^B_2$, the picture $B^B_1$ belongs to the former GOP and the pictures from $B^B_2$ form a new GOP. The new GOP can be encoded with the same method described in subsection A.

A GOP can be ended by a reference picture. Therefore the picture $B^B_1$ must be encoded as a reference picture. Further, the picture $B^B_1$ as a P-picture but an I-picture. FIG. 6 illustrates an example of this case.

C. A Scene Change Occurs in the n-th B-picture

If a scene change occurs in the n-th B-picture after the reference picture $R^X$, $2 \leq n \leq M-1$, the pictures until $B^X_{n-1}$ belong to the former GOP and the pictures from $B^X_n$ form a new GOP. The new GOP is encoded with the same method described in subsection A.

Based on the method described in section B, the encoder will encode the picture $B^X_{n-1}$ as a P-picture, and the pictures $B^X_1 \sim B^X_{n-2}$ (if any) are encoded as B-pictures by referencing to the picture $R^X$ and the new generated P-picture.

D. A Scene Change Occurs in a Reference Picture

Please refer to FIG. 3. If a scene change occurs in the picture $R^B$, the picture $B^A_{M-1}$ belongs to the former GOP and the pictures from $R^B$ form a new GOP. The former GOP can be coded by the method described in subsection C. The new GOP could be encoded with the same method described in subsection A.

Finally, we can simplify an algorithm for an encoder to encode the pictures before and after a scene change separately to make the video editing of scenes without any re-encoding. FIG. 7 shows the flowchart of the video encoding method with support for editing when scene changed of the present invention.

Step 702: Capture the picture $PIC_n$ in the display order and detect the scene change.

Step 704: If there is no scene change in the picture $PIC_n$, the flowchart jumps to step S706. If there is a scene change in the picture $PIC_n$, the flowchart jumps to step S708.

Step 706: Code pictures in the coding order and jump back to step S702.

Step 708: If the picture $PIC_{n-1}$ is not coded as a reference picture, the flowchart jumps to step S710. If the picture $PIC_{n-1}$ is coded as a reference picture, the flowchart jumps to step S716.

Step 710: If there are B-pictures preceding a previous reference picture, finish coding the B-pictures.

Step S712: Encode the picture $PIC_{n-1}$ as a P-picture.

Step S714: If there are B-pictures preceding the picture $PIC_{n-1}$, coding the B-pictures and jumping to step S718.

Step S716: If there are B-pictures preceding the picture $PIC_{n-1}$, coding the B-pictures and jumping to step S718.

Step S718: Start a new GOP and encode the picture $P_{n+M-1}$ as an I-picture.

Step S720: Encode the pictures $P_n \sim P_{n+M-2}$ as B-pictures with only referencing to the picture $P_{n+M-1}$.

Because the present invention starts a new GOP when the scene change occurred, the image editor can cut the video sequence directly without re-coding. Therefore, the performance of the image editor can be increased and the image quality will not be loss.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A video encoding method with support for editing when scene changed, the distance between two reference pictures being defined as M in a GOP, the method comprising the steps of:

capturing pictures in a display order;

detecting the scene change for a picture $PIC_n$; and coding the pictures in a coding order when there is not a scene change occurred for the picture $PIC_n$, and coding the pictures by a special processing when there is a scene change occurred for the picture $PIC_n$;

the special processing comprising:

executing a first and a third coding stages when the picture $PIC_{n-1}$ is not a reference picture; and executing a second and the third coding stages when the picture $PIC_{n-1}$ is a reference picture;

wherein the first coding stage is to re-code the picture $PIC_{n-1}$ as a P-picture type, the second coding stage is to code the pictures of B-picture type preceding the picture $PIC_{n-1}$, and the third coding stage is to start a new GOP, to code a picture $PIC_{n+M-1}$ as a I-picture type, and to code the pictures $PIC_n$ to $PIC_{n+M-2}$ as B-picture type with only referencing to the picture $PIC_{n+M-1}$.

2. The video encoding method of claim 1, wherein the first coding stage finishes coding the pictures of B-pictures type if there are pictures of B-pictures type preceding a previous reference picture.

3. The video encoding method of claim 1, wherein the first coding stage codes the pictures of B-pictures type if there are pictures of B-pictures type preceding the picture $PIC_{n-1}$.

* * * * *